United States Patent [19]

Bombeke et al.

[11] Patent Number: 5,014,760
[45] Date of Patent: May 14, 1991

[54] STEEL WIRE FOR REINFORCING ELASTOMER ARTICLES WITH IMPROVED ADHESION PROMOTING LAYER

[76] Inventors: Martin Bombeke, Moregemplein 11, B-9790 Wortegem-Petegem; Paul Dambre, Lokerstraat 6, B-8949 Kemmel, both of Belgium

[21] Appl. No.: 3,950

[22] Filed: Jan. 16, 1987

[30] Foreign Application Priority Data

Jan. 28, 1986 [GB] United Kingdom ............... 8601986

[51] Int. Cl.$^5$ .................... B60C 9/00; C21D 9/52; C25D 7/06
[52] U.S. Cl. .................... 152/451; 152/527; 152/565; 156/910
[58] Field of Search .................... 152/451, 527, 565; 156/124, 910; 57/902; 204/28, 48; 148/12 B, 156, 320; 428/625, 677

[56] References Cited

U.S. PATENT DOCUMENTS

| | | |
|---|---|---|
| 3,953,250 | 4/1976 | Golland et al. ............... 152/451 X |
| 4,050,996 | 9/1977 | Klingenmaier ............... 204/28 |
| 4,090,697 | 5/1978 | Perrine ............... 266/111 |
| 4,180,418 | 12/1979 | Paulitsch et al. ............ 148/12 B X |
| 4,517,066 | 5/1985 | Benko ............... 156/124 X |
| 4,520,857 | 6/1985 | Ogino et al. ............ 152/527 |
| 4,545,834 | 10/1985 | Shemenski et al. ............ 156/910 X |
| 4,628,977 | 12/1986 | Ogino et al. ............ 152/451 |

Primary Examiner—Michael W. Ball
Attorney, Agent, or Firm—Cushman, Darby & Cushman

[57] ABSTRACT

High strength steel wire for use e.g. in tire reinforcement is treated so as to have a cementite free surface region. This can be achieved by electroplating or other coating methods, or be decarburizing the surface. The wire has increased resistance to hydrogen embrittlement and corrosion fatigue. The wire with its ferrous surface region is then covered with a rubber adherent outer layer of e.g. brass.

8 Claims, 2 Drawing Sheets

STEEL WIRE FOR REINFORCING ELASTOMER ARTICLES WITH IMPROVED ADHESION PROMOTING LAYER

FIELD OF THE INVENTION

The present invention relates to steel wire and particularly, but not exclusively, steel wire possessing a high tensile strength for use as a reinforcement in elastomer articles, such as e.g. rubber tires, high-pressure hoses, conveyor belts and the like.

BACKGROUND OF THE INVENTION

Among steel elements for rubber reinforcement there are mainly used brass-coated wires and galvanized wires, including cables, cords, fabrics and other products made from the wires. Brass-coated steel wires and steel cords have found the widest variety of applications as strengthening elements in vulcanized rubber products and especially in radial tires, because of their attractive vulcanization bonding properties and their elevated mechanical strength, which often may exceed 2000 $N/mm^2$. Typical examples include bead wire (up to 2 mm diameter), medium to fine cable and hose wire (up to 0.8-1.0 mm diameter) and especially tire cord made from fine steel wires (0.1 to 0.4 mm diameter) having a tensile strength of at least 2400 $N/mm^2$. Such brass-coated wires are normally produced from plain carbon steel with a carbon content of at least 0.4% by a wire making process which usually involves (after prior deformation) a patenting step to form a pearlitic wire structure, a wire drawing operation to obtain a required final wire diameter and tensile strength and a coating operation to provide the wire surface with a rubber adherent brass layer of appropriate composition and thickness (usually a CuZn-alloy with not less than 60% copper and a coating thickness below 0.50 micrometer).

Prior art pearlitic steel wires with or without a rubber adherable surface coating are not immune to hydrogen embrittlement and may fail by sudden brittle cracking or by corrosion fatigue degradation according to the prevailing stress and environmental conditions in service. This is particularly true of brass-coated steel wires or steel cords exposed during tire usage to humidity or other corrosive agents, which cannot be avoided in harsh driving conditions. The situation becomes even worse when steel wires of higher than normal strength are employed.

In this respect it is now generally acknowledged that common rubber adherent coatings, and in particular thin brass coatings, cannot afford adequate protection of the steel wire substrate against hydrogen penetration and resulting embrittlement. Indeed, incidental coating imperfections or damaged areas due to handling are not always easy to avoid. In addition, fretting damage occuring as a result of cord usage will inevitably cause local penetration of the coating.

Recently, a strong desire to raise useful wire and cord strength has created an even stronger need for preventing premature wire and cord breakage in some applications, especially in heavy-duty tires. Hence, there is a clear demand in industry to increase the resistance to hydrogen embrittlement and corrosion fatigue of current brassed wires and cords of conventional strength to ensure a more durable reinforcement and to achieve a longer tire life. Moreover, there is a great need for imparting better protection to high-tensile strength wires and cords, with tensile strength levels in excess of 3000 $N/mm^2$ against rapid and unpredictable cracking by hydrogen embrittlement and against early deterioration by corrosion fatigue and stress corrosion effects, given the most unreliable cracking behaviour of current high-tensile strength reinforcement wires in severe loading conditions and particularly under conditions of humidity and corrosive attack.

In order to overcome some of the above-mentioned shortcomings of current wires or at least to reduce the severity thereof, various proposals have been made in the recent past. Among these proposals are measures intended to improve the protective capacity of the rubber adherent brass coating, e.g. by using a compact layer of increased thickness and attempts to develop a more corrosion resistant brass alloy composition, e.g. a ternary alloy such as CuZn-Co, CuZn-Ni, etc. It has also been attempted to seal the brass surface or to modify it by chemical means, by metallic top films and/or by applying corrosion inhibiting compounds. In spite of the fact that these measures may decrease the surface corrosion rate to some extent, it has been observed that hydrogen embrittlement is not yet sufficiently suppressed. Furthermore, there can occur undesirable side effects on rubber adhesion.

Other proposals often relate to the selection of corrosion resistant alloyed steel compositions as a wire material; however such materials are more expensive and frequently cause difficulties in heat processing and drawability of fine wires.

SUMMARY OF THE INVENTION

Confronted with the persistent brittle cracking and corrosion fatigue problem of current wires and taking into consideration that prior art proposals to overcome these deficiencies are still unsatisfactory, there have now been carried out in-depth investigations and numerous experiments in order to unveil the possible degradation causes. From these findings it has been deduced that the surface state of the bare steel wire is most important as regards defects which are present in the debris layer, microstructure, presence of stress raisers, sensitivity to and diffusivity of hydrogen, general corrosion resistance and occurrence of local attack at preferential locations. Hence, it has been concluded that proper control of at least some of these factors may achieve the desired improvement in hydrogen embrittlement resistance and corrosion fatigue life of steel wires, in particular brass-coated wires and steel cords for use in heavy-duty tires exposed to humidity and other corrosive effects and especially such wires and cords having a tensile strength increased above usual levels of 2500-3000 $N/mm^2$.

Viewed from one broad aspect there is disclosed herein a steel wire drawn from carbon steel with a carbon content of at least 0.4% to a tensile strength of at least 2000 $N/mm^2$, the wire having a core of a work-hardened essentially pearlitic microstructure and an outer rubber adherent layer, characterized in that said wire core is provided underneath said layer with a continuous surface region which is ferrous and substantially free of cementite and other precipitated phases, the surface region extending throughout for a depth of at least 0.5 μm. The rubber adherent layer may be a brass layer.

In some preferred arrangements, the surface region is provided by coating the steel wire and viewed from another broad aspect there is disclosed herein a steel wire characterized in that there is applied to the surface thereof a continuous ferrous coating which forms a surface region substantially free of precipitated phases as well as a process for the treatment of steel wire by the application of a continuous coating, characterized in that the coating is ferrous and substantially free of precipitated phases. The thus coated steel core is then covered in a subsequent step with a rubber adherent layer, e.g. brass.

According to one specific embodiment the surface region is composed of a coating of substantially pure iron obtained e.g. by electrolytic iron plating. According to a preferred aspect thereof, such coating is metallurgically diffusion bonded to the harder wire core. This diffusion bonding step is then carried out before covering the coated steel core with the rubber adherent layer.

According to another embodiment the surface region is composed of an iron based alloy comprising nickel, chromium, manganese or zinc as an alloying element in an amount of preferably less than 80%, obtained e.g. by alloy plating or by sequential plating and diffusion. Most preferably a binary iron nickel alloy is used. Again, prior to the application of a rubber adherent layer, the alloy coating can be metallurgically diffusion bonded to the harder wire core.

According to a further possible embodiment the surface region on the steel wire core is formed of ferrite containing less than 0.02% carbon, and possibly with alloying elements, which is obtained either by a strip cladding or other coating operation in a suitable prior processing stage.

In an alternative type of arrangement the surface region may be formed by controlled decarburization of the basic steel wire. Thus a surface region of ferrite containing less than 0.02% carbon may, for example, be formed. Accordingly, viewed from another broad aspect there is disclosed herein a process for the treatment of steel wire drawn from carbon steel with a carbon content of at least 0.4% to a tensile strength of at least 2000 $N/mm^{-2}$ and having an essentially pearlitic microstructure, wherein a surface region is decarburized, characterized in that the treatment consists of controlled decarburization to produce a continuous surface region which is substantially free of precipitated phases and which extends throughout for a depth of at least 0.5 $\mu$m. The thus decarburized surface region is further covered with an outer rubber adherent layer, e.g. brass.

In most cases the iron-based surface region advantageously possesses a deformed structure which is obtained by applying a surface deformation technique or more simply by a wire drawing process which starts from a semi-product diameter which already has the iron-based layer.

In practice the ferrous surface regions described above have an average layer thickness (or depth) of preferably at least 1 $\mu$m to ensure a continuous layer in practical working conditions. An upper limit of 10 $\mu$m should not be exceeded, since otherwise the wire surface may be weakened too much for sustaining fatigue cycling. An optimum range varies from 0.5 to 5 $\mu$m, and most preferably from 1 to 2 $\mu$m.

For use e.g. in tires, the wire will generally have an outer layer of rubber adherent material such as brass over the ferrous surface region.

Although the concepts are applicable to various combinations of steel wire cores and rubber adherent outer coatings, they are particularly directed to high-carbon steel wires (and cords made therefrom) covered by a rubber adherable thin brass alloy coating (60-75% Cu; thickness less than 0.5 $\mu$m) for use in rubber tires. Such wires have a diameter of usually between 0.1 and 0.5 mm, and are drawn from pearlitic steel with 0.6 to 1.0% C. (more often 0.7-0.8% C.) to a strength above 2500 $N/mm^2$.

The concepts are however also applicable to steel wires with other rubber adherent coatings (e.g. metal or plastic coatings).

The concepts are not restricted to wire materials having a circular cross-section. Other shapes such as a strip, a flat laminate or polygonal forms can be used also and the expression "wire" is not to be limiting.

In a particularly advantageous embodiment there is provided a rubber adherent steel cord of elevated tensile strength in excess of 2700 $N/mm^2$, and preferably increased above 3000 $N/mm^2$, for use in high-performance vehicle tyres, which cord is provided with an improved resistance to unexpected brittle filament cracking (hydrogen embrittlement) and with a markedly increased corrosion fatigue limit, the cord being assembled from a plurality of hard drawn pearlitic steel wires covered by a thin brass coating containing from 60 to 75% Cu, more often a thermodiffused brass alloy with 60 to 70% Cu and a thickness from 0.10 to 0.40 $\mu$m, the hard steel wire core below the brass coating comprising a cementite-free surface region of substantially pure electroplated iron forming a continuous and essentially uniform barrier layer of at least 0.5 $\mu$m thick between the steel wire core and said outer brass layer.

In a preferred embodiment of this arrangement the iron "rim" is metallurgically bonded to said steel core and possesses a work-hardened deformation structure.

The disclosure further relates to elastomeric articles, and in particular vehicle tyres, which are reinforced by the improved steel wires or wire cords made therefrom.

BRIEF DESCRIPTION OF THE DRAWINGS

In order that the invention and its various broad concepts may be better understood, reference will be made to the following examples and to the accompanying drawings in which.

DETAILED DESCRIPTION OF THE INVENTION

Figures 1A, 1B:
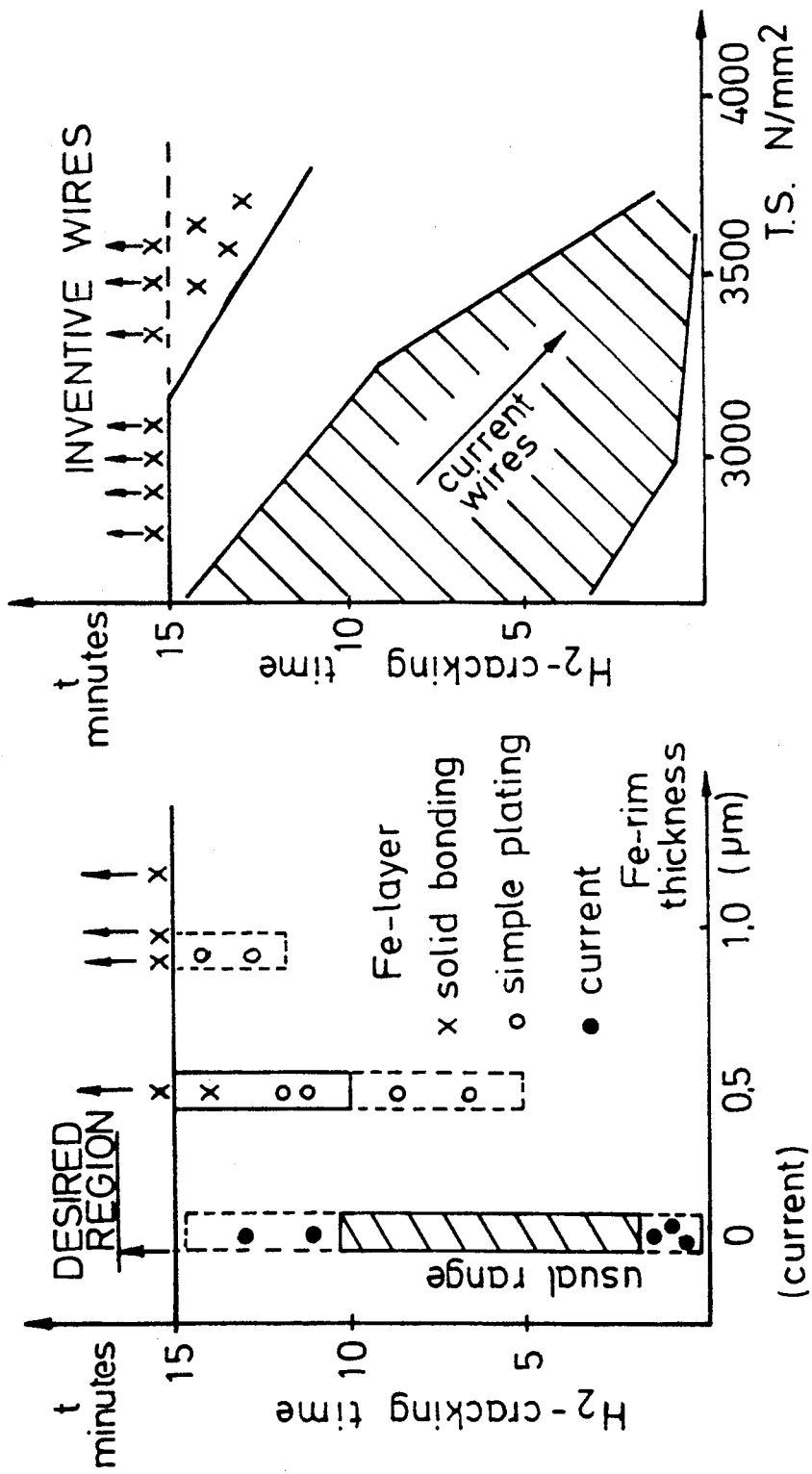
FIGS. 1a and 1b are graphs showing the failure rate in hydrogen embrittlement conditions of known steel wires in comparison with steel wires of this disclosure.

Referring now to FIGS. 1a and 1b, these relate to steel wires of 0.65 to 0.85% carbon. Some of these have been electroplated at a suitable intermediate diameter with essentially pure iron having a varying plating thickness. Prior to the application of a brass coating some of the iron-plated wires have been subjected to diffusion annealing (for example at the stage of final patenting) to effect a solid metallurgical bond between the steel wire core and the iron plate. The thus treated wires of pearlitic structure were then brass coated and wet drawn to a final diameter below 0.5 mm so as to obtain a rubber adherent high-tensile brassed wire having a strength of about 2800 $N/mm^2$. The wires had iron barrier layers of varying thickness between the hard drawn pearlitic steel core and the outer brass coating. It can be seen in FIG. 1a that cracking time in a standard H$_2$SO$_4$-test (hydrogen charging under bending stress of 600 N/mm$^2$) is markedly improved by the presence of an iron sublayer with symbol "X" showing the behaviour with metallurgically bonded iron, and symbol "O" the behaviour with iron plating after final patenting. It is believed that the solid metallurgically bonded iron layer enables the deposition of a more uniform brass topcoating and that the thus coated wire can be deformed more uniformly during subsequent drawing with the result of a smooth substantially pore free brass surface. This may have an additional favorable influence on adhesion retention to rubber, particularly after ageing and in humid environments or after rubber overcure. Also shown is similar wire without an iron coating, i.e. current or conventional wire. The really safe region in terms of hydrogen embrittlement susceptibility is represented by cracking times of 15 minutes and above, which is readily reached with an iron rim thickness from about 0.8 -1 μm onwards.

FIG. 1b gives a schematic compilation of average H$_2$-cracking times plotted versus wire strength, respectively for conventional steel wire and for wires treated as above (with closed, i.e. diffusion annealed Fe-layer of about 0.8 to 1 μm thick). It illustrates that increased erratic breaking of current wires with raising tensile strength is reduced significantly by using the treated wires.

Figure 2:
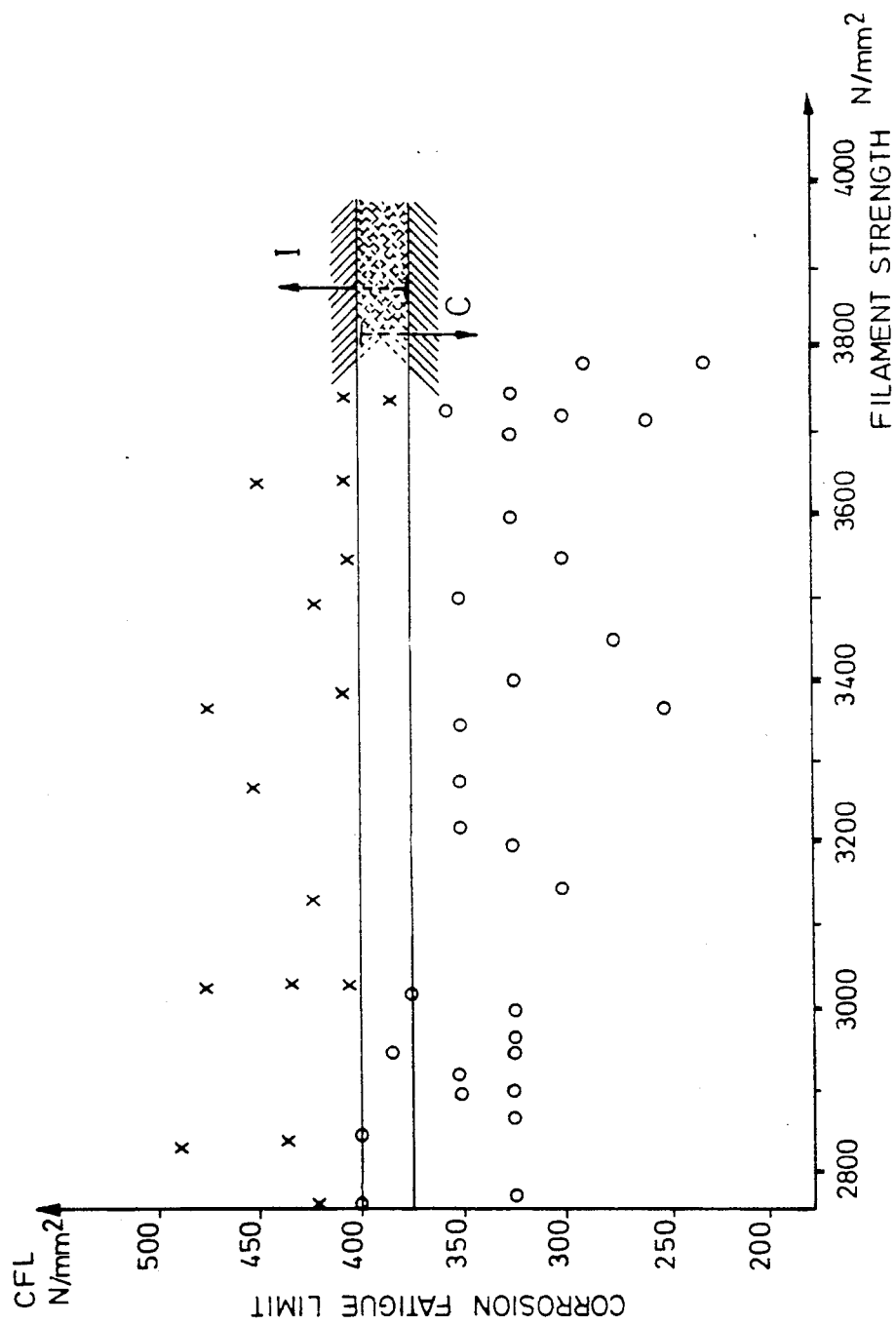
FIG. 2 is a graph in which the corrosion fatigue limit is plotted for different wire and cord strengths, respectively of conventional wire materials and of the new wire materials.

FIG. 2 relates to cyclic bending corrosion fatigue testing of current wires (designated by symbol "O") and of the treated wires with an iron rim of at least 0.5 μm, of similar strength (identified by symbol "X"). The testing is either by fatigue cycling after corrosive storage in 95% relative humidity at 70° C. or by direct wet cycling. It can be concluded that the corrosion fatigue limits (CFL) of the new wires are shifted to markedly higher values in comparison to current wires which generally are situated below a CFL-limit of 400 N/mm$^2$ with increasing fluctuations and lower average limits as a function of increasing ultimate wire strength.

Similar advantageous results, albeit somewhat less marked, are achievable by replacing the preferred iron coating layer of the wires by a cementite-free ferrite rim (C≦0.02% and preferably max. 0.01%) obtained by controlled decarburization in a process stage preceeding final drawing and brass coating or by a process of cladding (e.g. sheathing of steel rod material with extra-low-carbon steel strip or with Armco iron foil). In the latter processes the optimum required thickness of the ferrite layer (0.5 to 5 μm) is more difficult to control given the fluctuations in normal industrial heat and deformation processing. In case of an excessive ferrite layer thickness (above 5 μm and mainly above 10 μm) there is a risk that the observed improvement in hydrogen cracking resistance may be offset by a decrease in (dry) fatigue resistance due to enhanced surface weakening and the possible occurrence of crack initiation at comparatively lower average stresses by cyclic microplastic surface deformations.

Although it is not yet clearly understood why the presence of an optimum cementite-free ferrous layer is so effective in reducing susceptibility to hydrogen embrittlement and in improving corrosion fatigue resistance of high-tensile steel wire (with or without brass alloy outer coating) it is believed that the absence of major stress raisers in the wire surface (cementite lamellae and sharp fragments; less surface deformation debris; inclusion-free in case of iron), the enhanced local hydrogen diffusivity (avoidance of critical combinations of hydrogen and peak stresses) and further the intrinsic lower corrosion rate (with less galvanic coupling effects at preferential spots) of pure ferrite and iron all work together in a beneficial way. As a result, the capacity of the steel wire surface to resist or retard onset of brittle cracking and to withstand more severe corrosion fatigue conditions is remarkably improved.

Although the discussion above is largely in connection with cementite-free ferrous layers such as pure ferrite and electroplated iron, the iron-base surface composition which can be used herein may further contain a binary element such as e.g. Ni, Mn, Cr, Zn and the like, or even a combination thereof. Next to an electroplated iron layer there can be used most preferably an electroplated Fe-Ni alloy layer or an electroplated Fe-Zn layer.

Some examples of processes of preparing steel wires having the required surface region and examples of such surface treated wires will now be described by way of illustration.

EXAMPLE 1

Steel wire material of 0.70 and 0.80% C (intended for tire cord application) was drawn to a diameter between 1.2 and 1.5 mm, cleaned and electroplated with an iron layer of 5 to 6 μm from a suitable electrolyte bath (sulphate, chloride or sulphamate). Such wire was subjected to isothermal patenting (furnace austenitization with protective atmosphere or rapid direct resistance heating to prevent substantial surface iron oxidation) and plated with a brass alloy of 67% Cu. The thus treated wire was drawn to a fine diameter ranging from 0.20 to 0.25 mm, so as to obtain a high-tensile strength wire of varying strength comprising a substantially pure (strained) iron rim with average thickness of about 1 μm between the hard steel core and the outer brass covering of about 0.23 μm thickness. The same steel wire material without iron electroplate was patented, brass coated and drawn in similar conditions for the sake of comparison. Wire samples thereof were investigated to determine strength, cracking time in a standard hydrogen embrittlement H$_2$SO$_4$-test (H$_2$-charging in 0.1N H$_2$SO$_4$ at bending stress of 600 N/mm$^2$) and corrosion fatigue limit (CFL) in a cyclic bending fatigue test in humid conditions.

The results are listed below.

TABLE 1

| | | Strength and cracking resistance of current wires and the new wires. | | | | | |
|---|---|---|---|---|---|---|---|
| | | Current wires | | | New wires | | |
| | Φ mm | T.S. N/mm$^2$ | H$_2$SO$_4$ minutes | CFL N/mm$^2$ | T.S. N/mm$^2$ | H$_2$SO$_4$ minutes | CFL N/mm$^2$ |
| 0.70% C | 0.25 | 2830 | 4 to ≧15 | 300–400 | 2795 | ≧15 | 400–450 |
| | 0.23 | 2980 | 3–14 | 335 | 3010 | ≧15 | 400–425 |
| | 0.22 | 3225 | 2–5 | 250–275 | 3205 | 14–≧15 | 375–410 |
| 0.80% C | 0.25 | 3030 | 5–14 | 275–375 | 3012 | ≧15 | 400–425 |

TABLE 1-continued

Strength and cracking resistance of current wires and the new wires.

| | Current wires | | | New wires | | |
|---|---|---|---|---|---|---|
| Φ mm | T.S. N/mm² | H₂SO₄ minutes | CFL N/mm² | T.S. N/mm² | H₂SO₄ minutes | CFL N/mm² |
| 0.23 | 3260 | 2–11 | 325 | 3245 | ≧15 | 425–475 |
| 0.23 | 3400 | 0.3–4 | 250–325 | 3384 | ≧15 | 425 |
| 0.22 | 3590 | 0.3–2 | 200–350 | 3675 | 10–≧15 | 400 |

From the tabulated results it follows that there is no clear line in the cracking resistance and corrosion fatigue limit of conventional wires, which reflects the erratic response of their surface structure to severe conditions of corrosion and hydrogen charging. On the other hand, the surface treated wires according to the invention show a remarkable reliability in H₂-embrittlement conditions and their corrosion fatigue limit (CFL) can be kept largely above 400 N/mm², even when ultimate strength is raised to a level of 3500 N/mm² and more.

EXAMPLE 2

In a second example 5.5 mm wire rod material of 0.70% C and 0.80% C was processed to a final brassed wire diameter of 0.23 mm giving tensile strength classes of 2700–3000 N/mm² and 3000–3300 N/mm² respectively. Part of the rod material was first subjected to a decarburization furnace anneal at a temperature of 700° to 1000° C. in a wet atmosphere (H₂+H₂O, dew point 20° C.) to obtain a decarburized surface layer of about 0.13 mm giving a pure ferrite rim of a thickness of 50–60 μm. After the successive manufacturing steps (predrawing - isothermal patenting and brass plating -wet drawing to 0.23 mm) a brassed steel wire was obtained comprising a cementite-free ferritic surface layer of about 0.9 to 1.4 μm below the outer brass coating. Said wires were compared to non-decarburized conventional wires in the H₂SO₄-test (hydrogen embrittlement susceptibility) and in the wet Hunter test (cyclic bending corrosion fatigue in moisture). The results showed that cracking time in H₂SO₄ of the new wires systematically exceeded 15 minutes whereas current wires fluctuated between 2 and 15 minutes. In corrosion fatigue testing, however, the new wires were only slightly better than current wires (difference of 15 to 50 N/mm²) and mostly remained below a target CFL (corrosion fatigue limit) of 400 N/mm², which means that a ferritic layer is inferior to a pure iron rim (free of inclusions and steel impurities) under circumstances of corrosion fatigue.

EXAMPLE 3

In the third example there is investigated the resistance to hydrogen induced cracking and the corrosion fatigue limit of the new wires comprising a substantially pure cementite-free iron alloy barrier layer between the proper steel core and the outer brass surface. Such wires were made of 0.83% C-steel and were drawn to a strength level of 3300–3500 N/mm² for a diameter of 0.22 mm.

The results are summarized below.

TABLE 2

| Barrier layer | T.S. N/mm² | H₂SO₄-test minutes | CFL N/mm² |
|---|---|---|---|
| I. Fe - 18% Zn | 3390 | ≧15 | 420–430 |

TABLE 2-continued

| Barrier layer | T.S. N/mm² | H₂SO₄-test minutes | CFL N/mm² |
|---|---|---|---|
| 0.6 μm Fe - 60% Ni 0.95 μm | 3372 | ≧15 | 460–490 |
| II without barrier layer (current wire) | 3300–3500 | ≧15 (1–12) | <400 (250–375) |

It can be seen that current high-tensile strength tire cord wires are unreliable in hydrogen embrittlement conditions and that their corrosion fatigue limit is markedly inferior in comparison to that of improved wires having the surface layer composition.

Thus, at least in some preferred embodiments there has been found a simple and yet surprisingly effective solution to the premature brittle or corrosive cracking problem of steel wires with rubber adherent coating. This assists in the prevention of early failures of brassed wires and tire cord in demanding tire service and in the provision of improved reliability in the use of such wires having an increased tensile strength. Contrary to common belief, the solution is mainly based on the provision of a comparatively soft wire surface composition which is substantially cementite-free iron based material of homogeneous structure and sufficient purity and which forms a continuous rim of suitable thickness around the hard steel wire core and is preferably metallurgically bonded thereto.

We claim:

1. A steel wire for reinforcement of vulcanized elastomers drawn form carbon steel with a carbon content of at least 0.4% and a tensile strength of at least 2000 N/mm², the wire having a core of a work-hardened essentially pearlitic microstructure and an outer layer able to adhere to rubber, characterized in that said wire core is provided underneath said outer layer with a continuous surface region which is ferrous and substantially free of cementite and other precipitated phases, the surface region extending throughout for a depth of at least 0.5 μm and further characterized in that the rubber adherent layer is a brass layer.

2. A wire as claimed in claim 1 characterized in that the surface region is applied to the steel wire as a coating.

3. A wire as claimed in claim 2, characterized in that the coating consists of substantially pure iron.

4. A wire as claimed in claim 3, characterized in that said coating is metallurgically diffusion bonded to the harder wire core.

5. A steel wire as claimed in claim 1 characterized in that the depth of the surface region is up to 5 μm.

6. A wire as claimed in claim 1, characterized in that the wire has a tensile strength of at least 3000 N/mm².

7. An elastomeric article reinforced by a steel cord as claimed in claim 1.

8. An article as claimed in claim 7, in the form of a vehicle tire.

* * * * *